No. 867,082. PATENTED SEPT. 24, 1907.
L. A. ROCKWELL.
BISCUIT CUTTER.
APPLICATION FILED JAN. 21, 1907.
2 SHEETS—SHEET 1.
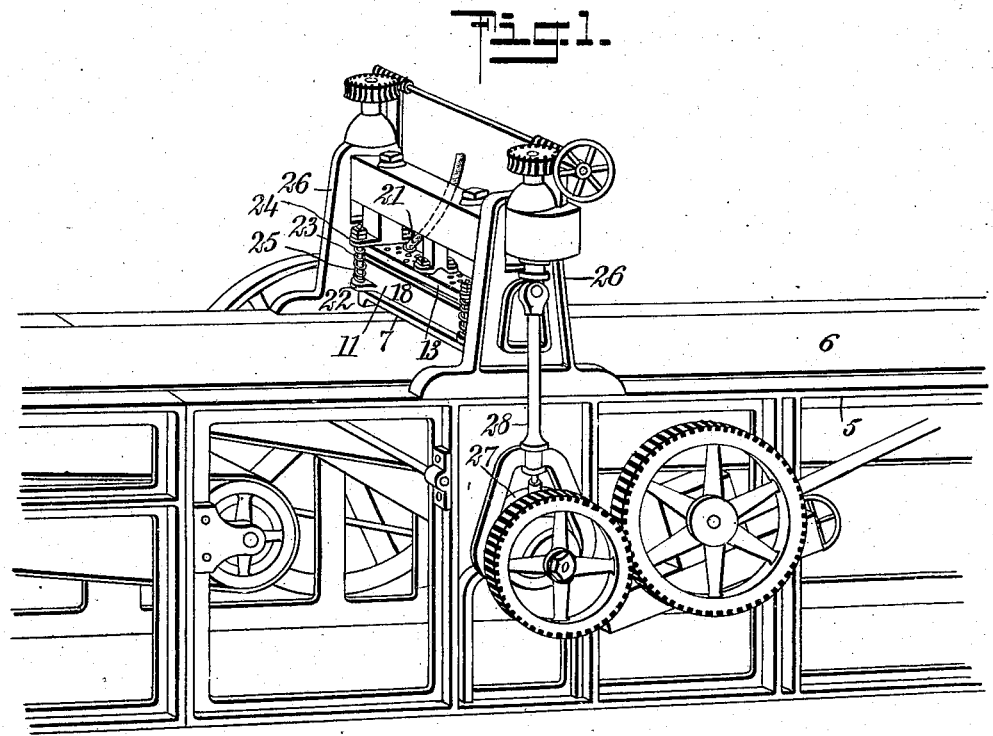
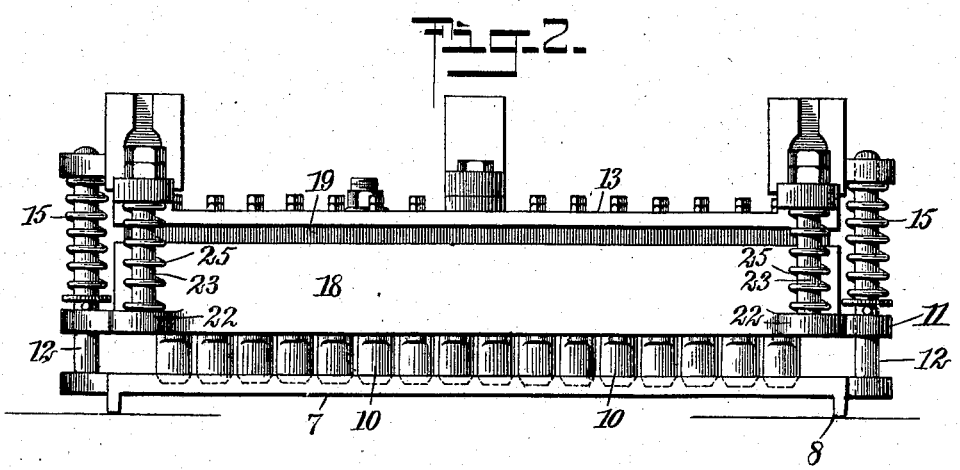
WITNESSES
H. G. Dieterich
J. P. Davis
INVENTOR
Lucius A. Rockwell
BY Munn & Co
ATTORNEYS No. 867,082. PATENTED SEPT. 24, 1907.
L. A. ROCKWELL.
BISCUIT CUTTER.
APPLICATION FILED JAN. 21, 1907.
2 SHEETS—SHEET 2.
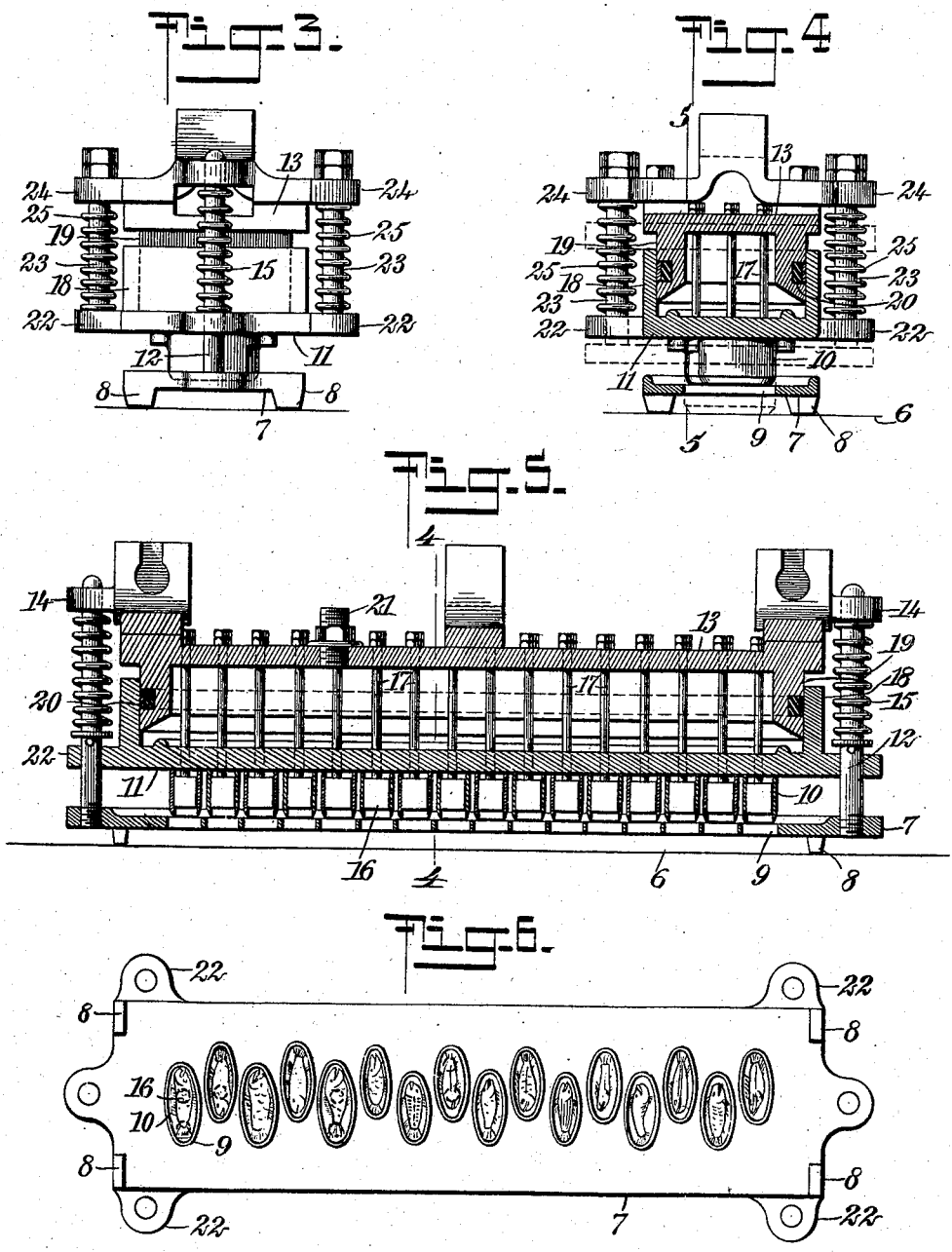
WITNESSES
INVENTOR
Lucius A. Rockwell
BY
ATTORNEYS

UNITED STATES PATENT OFFICE.

LUCIUS A. ROCKWELL, OF NEW YORK, N. Y.

BISCUIT-CUTTER.

No. 867,082.  Specification of Letters Patent.  Patented Sept. 24, 1907.

Application filed January 21, 1907. Serial No. 353,234.

*To all whom it may concern:*

Be it known that I, LUCIUS A. ROCKWELL, a citizen of the United States, and a resident of the city of New York, borough of the Bronx, in the county and State of New York, have invented a new and Improved Biscuit-Cutter, of which the following is a full, clear, and exact description.

This invention relates to improvements in devices for cutting or forming biscuits from sheets of dough, the object being to provide a cutter and die by means of which the dough may be evenly cut with a clear and smooth figure impressed thereon; and a further object is to provide means for ejecting the formed biscuits from the cutters.

I will describe a biscuit cutter embodying my invention and then point out the novel features in the appended claims.

Reference is to be had to the accompanying drawings forming a part of this specification, in which similar characters of reference indicate corresponding parts in all the figures.

Figure 1 is a perspective view of a portion of a dough machine, with a cutter embodying my invention thereon; Fig. 2 is a front elevation of the cutter; Fig. 3 is an end view thereof; Fig. 4 is a section on the line 4—4 of Fig. 5; Fig. 5 is a longitudinal section on the line 5—5 of Fig. 4; and Fig. 6 is a bottom plan of the cutter and die.

Referring to the drawings, 5 designates the frame of the machine, substantially of the usual construction and having an endless apron 6, for carrying the dough from the pressing rollers, which it is not deemed necessary to show.

Arranged over the endless apron is the cutting and printing device consisting of a base plate 7 provided at its under side with lugs 8, said base plate having a plurality of openings 9, through which the cutters 10 are designed to pass, said cutters being attached to a plate 11. The base plate 7 is held in position by rods 12 at each end, passing upward through lugs on the plate 11 and also engaging with lugs on a die-carrying plate 13.

Arranged between the lugs 14 on the die-carrying plate and the lugs on the plate 11, are springs 15, the object of which will hereinafter appear.

Engraved stamps or dies 16 are secured to rods 17, the upper ends of which are attached to the plate 13, and these rods are slidable through perforations in the plate 11, into the cutters 10. Around the top of the plate 11 is an upwardly extending flange 18, and engaging with the inner side thereof is a downwardly extended flange 19 formed on the plate 13. By this construction, an air chamber is formed, and the air is prevented from leaking outward between the flanges 18 and 19, by means of a gasket 20, compressed air being directed into the chamber through a nipple 21.

At the corners of the plate 11 are lugs 22 from which rods 23 extend upward through openings in lugs 24 at the corners of the die-carrying plate 13, and between alined lugs 22—24 and surrounding the rods, are coiled springs 25 which serve to move the die-carrying plate upward relatively to the cutter-carrying plate. The several plates are movable up and down in guides or standards 26 mounted on the frame of the machine, and the said movements are caused by an eccentric 27, the rod 28 of which connects with a portion of the cutting and stamping mechanism. Other means than that shown and having the same capabilities, may be employed, if found desirable in practice.

In operation, the complete device is moved downward until the lugs 8 on the base plate 7 strike the endless carrier 6, and the downward motion continues until the plate 11 reaches such a point relative to the plate 7, as to allow the cutters 10 to come in contact with and cut through the dough. The pressure is thereby transferred from the base-plate 7 to the cutter-plate 11, which pressure causes the springs at the corners of the device to compress and the plates 11 and 13 to telescope together at their flanges, and force the printing stamps or dies down through the cutters 10, in contact with the dough, thus printing the same. The pressure being taken off by the upward movement of the cross-head of the machine, which carries the plate 13 and which is guided in the standards 26, the springs at the corners of the device expand, thus separating the plates 11 and 13 and consequently withdrawing the stamps or dies 16 from the dough, and at the same time compressed air is admitted into the chamber between the plates 11 and 13, and as the air escapes between the stamps or dies 16 and the walls of the cutters 10, the formed and printed dough is ejected upon the endless carrier 6 and carried forward by said carrier; whereupon the operation is repeated until the supply of dough is exhausted. It will be noted that as the plates 11 and 13 separate, the stamps or dies 16 move upward prior to the upward movement of the cutters 10, thus facilitating the discharge of the formed and printed dough.

Having thus described my invention, I claim as new and desire to secure by Letters Latent:

1. In a biscuit machine, opposing plates having telescoping flanges forming an air-chamber between the plates, dies and cutters carried respectively by said plates, said dies having timed movement different from that of said cutters, means for causing movement of said plates, and means for introducing compressed air between said plates.

2. In a biscuit machine, a cutter-carrying plate, cutters on said plate, a die-carrying plate, dies supported by said last-named plate and extended into the cutters, an upwardly extended flange on the cutter-carrying plate, a flange on the die-carrying plate, having sliding connection with the first-named flange, means for inducting compressed air into the space between the plates, and means for causing movements of the plates.

3. In a biscuit machine, a cutter-carrying plate, cutters attached to said plate, a die-carrying plate, rods extended downward from said die-carrying plate, and through the first-named plate, dies on said rods within the cutters, flanges on the plates having sliding connection one with the other, means for moving the plates downward, springs for moving the plates upward, and means for directing compressed air into the space between the plates.

4. In a biscuit machine, a base-plate having openings, rods extended upward from the base-plate, a cutter-carrying plate movable on said rods, cutters secured to the last-named plate and movable through said openings of the first-named plate, a die-carrying plate slidable on said rods, dies carried by the die-carrying plate and movable in the cutters, flanges on the die and cutter-carrying plates, having sliding connection one with the other, means for causing movements of the plates, and means for directing compressed air into the space between the die and cutter-carrying plates.

In testimony whereof I have signed my name to this specification in the presence of two subscribing witnesses.

LUCIUS A. ROCKWELL.

Witnesses:
 JNO. M. RITTER,
 T. W. HANAFORD.